United States Patent
Jin et al.

(10) Patent No.: US 10,619,586 B2
(45) Date of Patent: Apr. 14, 2020

(54) CONSOLIDATION OF CONSTRAINTS IN MODEL PREDICTIVE CONTROL

(71) Applicant: GM GLOBAL TECHNOLOGY OPERATIONS LLC, Detroit, MI (US)

(72) Inventors: Ning Jin, Novi, MI (US); Nicola Pisu, Canton, MI (US); Ruixing Long, Windsor (CA); David N Hayden, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 15/937,128

(22) Filed: Mar. 27, 2018

(65) Prior Publication Data

US 2019/0301387 A1    Oct. 3, 2019

(51) Int. Cl.

| F02D 41/14 | (2006.01) |
| F02B 37/18 | (2006.01) |
| F02D 41/00 | (2006.01) |
| F01L 1/344 | (2006.01) |

(52) U.S. Cl.
CPC .......... F02D 41/1406 (2013.01); *F01L 1/344* (2013.01); *F02B 37/18* (2013.01); *F02D 41/0002* (2013.01); *F02D 41/009* (2013.01); *F02D 41/0077* (2013.01); *F02D 41/1444* (2013.01);

(Continued)

(58) Field of Classification Search
CPC ............. F02D 41/0002; F02D 41/0077; F02D 41/1406; F02D 2041/1412
See application file for complete search history.

(56) References Cited

U.S. PATENT DOCUMENTS

| 4,161,929 A | 7/1979 | Nohira et al. |
| 5,101,786 A | 4/1992 | Kamio et al. |
| 5,706,780 A | 1/1998 | Shirakawa |

(Continued)

FOREIGN PATENT DOCUMENTS

| CN | 1594846 A | 3/2005 |
| WO | 2003065135 A1 | 8/2003 |

OTHER PUBLICATIONS

John C.G. Boot, "Quadratic Programming: Algorithms, Anomalies, Applications, vol. 2 of Studies in Mathematical and Managerial Economics," North Holland Publ. Comp., 1964; 213 pages.

(Continued)

*Primary Examiner* — Erick R Solis

(57) ABSTRACT

A method, control system, and propulsion system use model predictive control to control and track several parameters for improved performance of the propulsion system. Numerous sets of possible command values for a set of controlled variables are determined. Initial constraints for the controlled variables are determined, which include upper and lower limits for each controlled variable and upper and lower rate-of-change limits for each controlled variable. A set of consolidated constraint limits for the controlled variables is then determined. Each consolidated constraint limit is determined by consolidating one of the upper and lower limits with one of the upper and lower rate-of-change limits. A cost for each set of possible command values is determined, and the set of possible command values that has the lowest cost and falls within the set of consolidated constraint limits is selected for use in controlling the propulsion system.

20 Claims, 4 Drawing Sheets

(52) U.S. Cl.
CPC ........... *F02D 2041/1412* (2013.01); *F02D 2041/1433* (2013.01); *F02D 2200/1004* (2013.01)

(56) References Cited

U.S. PATENT DOCUMENTS

| | | | |
|---|---|---|---|
| 5,727,528 A | 3/1998 | Hori et al. | |
| 5,775,293 A | 7/1998 | Kresse | |
| 5,921,219 A | 7/1999 | Frohlich et al. | |
| 6,014,955 A | 1/2000 | Hosotani et al. | |
| 6,155,230 A | 12/2000 | Iwano et al. | |
| 6,173,226 B1 | 1/2001 | Yoshida | |
| 6,276,333 B1 | 8/2001 | Kazama et al. | |
| 6,532,935 B2 | 3/2003 | Ganser et al. | |
| 6,606,981 B2 | 8/2003 | Itoyama | |
| 6,704,638 B2 | 3/2004 | Livshiz et al. | |
| 6,704,641 B2 | 3/2004 | Tashiro et al. | |
| 6,826,904 B2 | 12/2004 | Miura | |
| 6,840,215 B1 | 1/2005 | Livshiz et al. | |
| 6,953,024 B2 | 10/2005 | Linna et al. | |
| 6,993,901 B2 | 2/2006 | Shirakawa | |
| 7,016,779 B2 | 3/2006 | Bowyer | |
| 7,021,282 B1 | 4/2006 | Livshiz et al. | |
| 7,051,058 B2 | 5/2006 | Wagner et al. | |
| 7,222,012 B2 | 5/2007 | Simon, Jr. | |
| 7,235,034 B2 | 6/2007 | Berglund et al. | |
| 7,236,874 B2 | 6/2007 | Ichihara | |
| 7,274,986 B1 | 9/2007 | Petridis et al. | |
| 7,275,518 B1 | 10/2007 | Gartner et al. | |
| 7,356,403 B2 | 4/2008 | Yoshioka et al. | |
| 7,395,147 B2 | 7/2008 | Livshiz et al. | |
| 7,400,967 B2 | 7/2008 | Ueno et al. | |
| 7,433,775 B2 | 10/2008 | Livshiz et al. | |
| 7,441,544 B2 | 10/2008 | Hagari | |
| 7,546,196 B2 | 6/2009 | Izumi et al. | |
| 7,563,194 B2 | 7/2009 | Murray | |
| 7,614,384 B2 | 11/2009 | Livshiz et al. | |
| 7,698,048 B2 | 4/2010 | Jung | |
| 7,703,439 B2 | 4/2010 | Russell et al. | |
| 7,715,975 B2 | 5/2010 | Yamaoka et al. | |
| 7,775,195 B2 | 8/2010 | Schondorf et al. | |
| 7,777,439 B2 | 8/2010 | Falkenstein | |
| 7,813,869 B2 | 10/2010 | Grichnik et al. | |
| 7,885,756 B2 | 2/2011 | Livshiz et al. | |
| 7,941,260 B2 | 5/2011 | Lee et al. | |
| 7,949,459 B2 | 5/2011 | Yoshikawa et al. | |
| 7,967,720 B2 | 6/2011 | Martin et al. | |
| 7,967,729 B2 | 6/2011 | Martin et al. | |
| 7,975,668 B2 | 7/2011 | Ramappan et al. | |
| 7,980,221 B2 | 7/2011 | Baur et al. | |
| 8,010,272 B2 | 8/2011 | Kuwahara et al. | |
| 8,027,780 B2 | 9/2011 | Whitney et al. | |
| 8,041,487 B2 | 10/2011 | Worthing et al. | |
| 8,050,841 B2 | 11/2011 | Costin et al. | |
| 8,073,610 B2 | 12/2011 | Heap et al. | |
| 8,078,371 B2 | 12/2011 | Cawthorne | |
| 8,086,390 B2 | 12/2011 | Whitney et al. | |
| 8,103,425 B2 | 1/2012 | Choi et al. | |
| 8,103,428 B2 | 1/2012 | Russ et al. | |
| 8,116,954 B2 | 2/2012 | Livshiz et al. | |
| 8,121,763 B2 | 2/2012 | Hou | |
| 8,176,735 B2 | 5/2012 | Komatsu | |
| 8,181,627 B2 | 5/2012 | Sharples et al. | |
| 8,209,102 B2 | 6/2012 | Wang et al. | |
| 8,209,104 B2 | 6/2012 | Soejima et al. | |
| 8,219,304 B2 | 7/2012 | Soma | |
| 8,241,177 B2 | 8/2012 | Doering et al. | |
| 8,307,814 B2 | 11/2012 | Leroy et al. | |
| 8,316,828 B2 | 11/2012 | Whitney et al. | |
| 8,447,492 B2 | 5/2013 | Watanabe et al. | |
| 8,468,821 B2 | 6/2013 | Liu et al. | |
| 8,483,935 B2 | 7/2013 | Whitney et al. | |
| 8,527,120 B2 | 9/2013 | Matthews et al. | |
| 8,560,204 B2 | 10/2013 | Simon et al. | |
| 8,566,008 B2 | 10/2013 | Soejima et al. | |
| 8,593,806 B2 | 11/2013 | Huang | |
| 8,594,904 B2 | 11/2013 | Livshiz et al. | |
| 8,635,001 B2 | 1/2014 | Doering et al. | |
| 8,739,766 B2 | 6/2014 | Jentz et al. | |
| 8,744,716 B2 | 6/2014 | Kar | |
| 8,862,248 B2 | 10/2014 | Yasui | |
| 8,954,257 B2 | 2/2015 | Livshiz et al. | |
| 8,977,457 B2 | 3/2015 | Robinette et al. | |
| 9,031,766 B2 | 5/2015 | DeLaSalle et al. | |
| 9,062,631 B2 | 6/2015 | Kinugawa et al. | |
| 9,067,593 B2 | 6/2015 | Dufford | |
| 9,075,406 B2 | 7/2015 | Nakada | |
| 9,145,841 B2 | 9/2015 | Miyazaki et al. | |
| 9,175,622 B2 | 11/2015 | Seiberlich et al. | |
| 9,175,628 B2 | 11/2015 | Livshiz et al. | |
| 9,222,426 B2 | 12/2015 | Rollinger et al. | |
| 9,243,524 B2 | 1/2016 | Whitney et al. | |
| 9,328,671 B2 | 5/2016 | Whitney et al. | |
| 9,334,815 B2 | 5/2016 | Cygan, Jr. et al. | |
| 9,347,381 B2 | 5/2016 | Long et al. | |
| 9,376,965 B2 | 6/2016 | Whitney et al. | |
| 9,378,594 B2 | 6/2016 | Wong et al. | |
| 9,382,865 B2 | 7/2016 | Genslak et al. | |
| 9,388,754 B2 | 7/2016 | Cygan, Jr. et al. | |
| 9,388,758 B2 | 7/2016 | Pochner et al. | |
| 9,399,959 B2 | 7/2016 | Whitney et al. | |
| 9,429,085 B2 | 8/2016 | Whitney et al. | |
| 9,435,274 B2 | 9/2016 | Wong et al. | |
| 9,447,632 B2 | 9/2016 | LeBlanc | |
| 9,528,453 B2 | 12/2016 | Whitney et al. | |
| 9,534,547 B2 | 1/2017 | Livshiz et al. | |
| 9,541,019 B2 | 1/2017 | Verdejo et al. | |
| 9,587,573 B2 | 3/2017 | Genslak et al. | |
| 9,599,049 B2 | 3/2017 | Zavala Jurado et al. | |
| 9,599,053 B2 | 3/2017 | Long et al. | |
| 9,605,615 B2 | 3/2017 | Long et al. | |
| 9,669,822 B2 | 6/2017 | Piper et al. | |
| 9,714,616 B2 | 7/2017 | Jin et al. | |
| 9,732,499 B2 | 8/2017 | Miyamoto et al. | |
| 9,732,688 B2 | 8/2017 | Cygan, Jr. et al. | |
| 9,765,703 B2 | 9/2017 | Whitney et al. | |
| 9,784,198 B2 | 10/2017 | Long et al. | |
| 9,789,876 B1 | 10/2017 | Livshiz et al. | |
| 9,797,318 B2 | 10/2017 | Storch et al. | |
| 9,863,345 B2 | 1/2018 | Wong et al. | |
| 9,920,697 B2 | 3/2018 | Pochner et al. | |
| 9,927,780 B2 | 3/2018 | Sun et al. | |
| 9,963,150 B2 | 5/2018 | Livshiz et al. | |
| 9,989,150 B2 | 6/2018 | Yamanaka et al. | |
| 10,047,686 B2 | 8/2018 | Jin | |
| 10,094,300 B2 | 10/2018 | Cygan, Jr. et al. | |
| 10,119,481 B2 | 11/2018 | Livshiz et al. | |
| 10,125,712 B2 | 11/2018 | Livshiz et al. | |
| 10,167,746 B2 | 1/2019 | Whitney et al. | |
| 10,273,900 B2 | 4/2019 | Whitney et al. | |
| 2004/0116220 A1 | 6/2004 | Yamamoto et al. | |
| 2005/0065691 A1 | 3/2005 | Cho | |
| 2007/0191181 A1 | 8/2007 | Burns | |
| 2009/0288899 A1 | 11/2009 | Belloso | |
| 2010/0211294 A1 | 8/2010 | Soejima | |
| 2011/0053720 A1 | 3/2011 | Kang et al. | |
| 2012/0010860 A1 | 1/2012 | Kirkling et al. | |
| 2016/0363063 A1* | 12/2016 | Pochner | F02D 41/1406 |
| 2017/0016407 A1 | 1/2017 | Whitney et al. | |
| 2017/0082055 A1 | 3/2017 | Cygan, Jr. et al. | |
| 2017/0306819 A1 | 10/2017 | Alfieri et al. | |
| 2017/0361842 A1 | 12/2017 | Livshiz et al. | |
| 2018/0293814 A1 | 10/2018 | Gilbert et al. | |
| 2019/0071097 A1 | 3/2019 | Livshiz et al. | |
| 2019/0100217 A1 | 4/2019 | Livshiz et al. | |

OTHER PUBLICATIONS

N. Lawrence Ricker, "Use of Quadratic Programming for Constrained Internal Model Control," Ind. Eng. Chem. Process Des. Dev., 1985, pp. 925-936.

(56) References Cited

OTHER PUBLICATIONS

C. E. Lemke, "A Method of Solution for Quadratic Programs," Rensselaer Polytechnic Institute, Troy, New York, Published Online: Jul. 1, 1962, pp. 442-453.
Kolmanovsky I., "Towards Engine and Powertrain Control Based on Model Predictive Control," Sep. 28, 2012, Powerpoint Presentation, 47 slides.
Gorinevsky, Lecture 14—Model Predictive Control Part 1: The Concept, Spring 2005, Powerpoint Presentation, 26 slides.
Bemporad, Alberto, "Model Predictive Control," Spring 2005, Powerpoint Presentation, 94 slides.
Boyd, S., "Model Predictive Control," Powerpoint Presentation, 25 slides.

\* cited by examiner

CONSOLIDATION OF CONSTRAINTS IN MODEL PREDICTIVE CONTROL

TECHNICAL FIELD

The present disclosure relates to a control system and method for controlling a propulsion system of a motor vehicle, and more particularly, to a control system and method that use a multivariable controller.

INTRODUCTION

Internal combustion engines combust an air/fuel mixture within cylinders to drive pistons, which produces drive torque. Air flow into the engine is regulated via a throttle valve. More specifically, the throttle valve adjusts throttle opening area, which increases or decreases air flow into the engine. For example, as the throttle opening area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of the air/fuel mixture provided to the cylinders. In compression-ignition engines, compression in the cylinders combusts the air/fuel mixture provided to the cylinders. Spark timing and air flow are primary mechanisms for adjusting the torque output of spark-ignition engines, while fuel flow may be a primary mechanism for adjusting the torque output of compression-ignition engines.

Engine control systems have been developed to control engine output torque to achieve a desired torque. Traditional engine control systems, however, do not control the engine output torque as accurately as desired and with taking other variables into consideration, such as fuel economy. Further, traditional engine control systems do not provide a rapid response to control signals or coordinate engine torque control among various devices that affect the engine output torque.

Model predictive control (MPC) systems have been proposed for improving control and response of the propulsion system. However, an extensive amount computational time and computing power are required to solve large complex problems with multiple controlled variables, each of which have several constraints including upper and lower limits as well as rate-of-change limits.

SUMMARY

The present disclosure provides a method and system of consolidating upper and lower constraints with rate-of-change constraints for controlled variables in an MPC control system. Therefore, the MPC problem is solved by using one or the other (but not both) of the upper constraint and the upper rate-of-change constraint; and the MPC problem is solved by using one or the other (but not both) of the lower constraint and the lower rate-of-change constraint. As such, computational time and computing power are reduced and the MPC problem becomes easier and faster to solve.

In one form, which may be combined with or separate from the other forms disclosed herein, a method for controlling a propulsion system of a motor vehicle is provided. The method includes a step of generating a plurality of sets of possible command values for a plurality of controlled variables and generating a set of initial constraints for the plurality of controlled variables. The set of initial constraints includes upper and lower limits for each controlled variable and upper and lower rate-of-change limits for each controlled variable. The method also includes generating a set of consolidated constraint limits for the plurality of controlled variables. Each consolidated constraint limit is determined by consolidating one of the upper and lower limits with one of the upper and lower rate-of-change limits for a respective controlled variable. The method further includes determining a cost for each set of possible command values and selecting the set of possible command values that has the lowest cost and falls within the set of consolidated constraint limits to define a set of selected command values. The set of selected command values includes a selected command value for each controlled variable.

In another form, which may be combined with or separate from the other forms disclosed herein, a control system is provided for controlling a propulsion system of a motor vehicle having an internal combustion engine. The control system includes a command generator module configured to generate a plurality of sets of possible command values for a plurality of controlled variables. The control system also has a constraints consolidation module configured to generate a set of initial constraints for the plurality of controlled variables, where the set of initial constraints includes upper and lower limits for each controlled variable and upper and lower rate-of-change limits for each controlled variable. The constraints consolidation module is also configured to generate a set of consolidated constraint limits for the plurality of controlled variables, where each consolidated constraint limit is determined by consolidating one of the upper and lower limits with one of the upper and lower rate-of-change limits. The control system further includes a cost module and a selection module. The cost module is configured to determine a cost for each set of possible command values. The selection module is configured to select the set of possible command values that has the lowest cost and falls within the set of consolidated constraint limits to define a set of selected command values. The set of selected command values includes a selected command value for each controlled variable.

In yet another form, which may be combined with or separate from the other forms disclosed herein, a propulsion system for a motor vehicle is provided. The propulsion system includes an internal combustion engine and an intake manifold having a throttle valve configured to control an amount of air drawn into the intake manifold through a selectively variable throttle opening area. The internal combustion engine defines at least one piston-cylinder assembly including a piston slidably disposed within a cylinder bore. The piston-cylinder assembly is configured to combust an air/fuel mixture to rotate a crankshaft to provide a drive torque to propel the motor vehicle. An intake valve is configured to draw air into the piston-cylinder assembly from the intake manifold, and an intake camshaft is configured to be rotated to control the intake valve. An intake cam phaser is configured to control rotation of the intake camshaft by controlling an intake cam phase angle. Similarly, an exhaust valve is configured to expel exhaust gases from the piston-cylinder assembly, and an exhaust camshaft is configured to be rotated to control the exhaust valve. An exhaust cam phaser is configured to control rotation of the exhaust camshaft by controlling an exhaust cam phase angle. A turbocharger has a turbine configured to be powered by the exhaust gases, and the turbocharger is configured to deliver compressed air to the throttle valve. A wastegate is configured to allow at least a portion of the exhaust gases to bypass the turbine of the turbocharger through a selectively variable wastegate opening area. An exhaust gas recirculation (EGR) valve is configured to selectively recirculate a portion of the exhaust gases to the intake manifold through a selectively variable EGR valve opening area.

The propulsion system further includes a control system having a command generator module, a constraints consolidation module, a cost module, and a selection module. The command generator module is configured to generate a plurality of sets of possible command values for a plurality of controlled variables. The plurality of controlled variables is selected from the following: the wastegate opening area, the throttle opening area, the EGR valve opening area, the intake cam phase angle, and the exhaust cam phase angle. The constraints consolidation module is configured to: generate a set of initial constraints for the plurality of controlled variables, the set of initial constraints including upper and lower limits for each controlled variable and upper and lower rate-of-change limits for each controlled variable; and generate a set of consolidated constraint limits for the plurality of controlled variables. Each consolidated constraint limit is determined by consolidating one of the upper and lower limits with one of the upper and lower rate-of-change limits. The cost module is configured to determine a cost for each set of possible command values. The selection module is configured to select the set of possible command values that has the lowest cost and falls within the set of consolidated constraint limits to define a set of selected command values. The set of selected command values includes a selected command value for each controlled variable.

Additional feature may be provided, including but not limited to the following: the set of consolidated constraint limits comprising an upper consolidated constraint limit for each controlled variable and a lower consolidated constraint limit for each controlled variable. The method and/or control system may be further configured to determine an upper rate-limit-based constraint for each controlled variable by: multiplying the upper rate-of-change limit for a respective controlled variable by a time step duration to determine an upper rate limit product for the respective controlled variable; and adding the upper rate limit product for the respective controlled variable to the selected command value for an immediate past time step of the respective controlled variable. Similarly, the method and/or control system may be further configured to determine a lower rate-limit-based constraint for each controlled variable by: multiplying the lower rate-of-change limit for a respective controlled variable by the time step duration to determine a lower rate limit product for the respective controlled variable; and subtracting the lower rate limit product for the respective controlled variable from the selected command value for the immediate past time step of the respective controlled variable. The method and/or control system may be configured to: determine each upper consolidated constraint limit by selecting the lesser of the upper limit for the respective controlled variable and the upper rate-limit-based constraint for the respective controlled variable; and determine each lower consolidated constraint limit by selecting the greater of the lower limit for the respective controlled variable and the lower rate-limit-based constraint for the respective controlled variable.

The method and/or control system may be configured to control a vehicle parameter based on at least one command value of the selected set of command values; determine a plurality of requested values; determine a plurality of predicted values; and determine the cost for each set of possible command values based on the plurality of requested values, the plurality of predicted values, and a plurality of weighting factors.

Even further additional features may be provided, including but not limited to the following: the plurality of controlled variables including a wastegate opening area, an EGR valve opening area, a throttle opening area, an intake cam phase angle, and an exhaust cam phase angle; and the plurality of predicted values including a predicted engine output torque, a predicted APC, a predicted amount of external dilution, a predicted amount of internal dilution, a predicted crankshaft angle, and a predicted combustion quality value; and the predicted combustion quality value being a predicted coefficient of variation.

If desired, the cost for each set of possible command values of the plurality of sets of possible command values may be determined with the following cost equation:

$$\text{Cost} = \sum (y(i|k) - y_{ref})^T Q_Y (y(i|k) - y_{ref}) + (u(i|k) - u_{ref})^T Q_U (u(i|k) - u_{ref}) + \Delta u(i|k)^T Q_{\Delta u} \Delta u(i|k)$$

$$y = \begin{bmatrix} \text{Te\_p} \\ \text{APC\_p} \\ \text{Dil\_ext\_p} \\ \text{Dil\_res\_p} \\ \text{CA\_p} \\ \text{COV\_p} \end{bmatrix}$$

$$y_{ref} = \begin{bmatrix} \text{Te\_r} \\ \text{APC\_r} \\ \text{Dil\_ext\_r} \\ \text{Dil\_res\_r} \\ \text{CA\_r} \\ \text{COV\_r} \end{bmatrix}$$

$$u = \begin{bmatrix} \text{WGO\_c} \\ \text{EGRO\_c} \\ \text{TO\_c} \\ \text{ICPA\_c} \\ \text{ECPA\_c} \end{bmatrix}$$

$$u_{ref} = \begin{bmatrix} \text{WGO\_r} \\ \text{EGRO\_r} \\ \text{TO\_r} \\ \text{ICPA\_r} \\ \text{ECPA\_r} \end{bmatrix}$$

where Te_p=predicted engine output torque; APC_p=predicted APC; Dil_ext_p=predicted amount of external dilution; Dil_res_p=predicted amount of internal dilution; CA_p=predicted crankshaft angle, with respect to a predetermined CA50 value; COV_p=predicted coefficient of variation; Te_r=requested engine output torque; APC_r=requested APC; Dil_ext_r=requested amount of external dilution; Dil_res_r=requested amount of internal dilution; CA_r=requested crankshaft angle with respect to the predetermined CA50 value; COV_r=requested coefficient of variation; WGO_c=commanded wastegate opening area; EGRO_c=commanded EGR valve opening area; TO_c=commanded throttle opening area; ICPA_c=commanded intake cam phase angle; ECPA_c=commanded exhaust cam phase angle;

WGO_r=requested wastegate opening area; EGRO_r=requested EGR valve opening area; TO_r=requested throttle opening area; ICPA_r=requested intake cam phase angle; ECPA_r=requested exhaust cam phase angle; $Q_y$=a predetermined weighting value for each y value; $Q_u$=a predetermined weighting value for each u value; $Q_{\Delta u}$=a predetermined weighting value for a rate of change of each u value; i=an index value; k=a prediction step; and T=a transposed vector.

Other additional features may include, without limitation: a predetermined weighting value for the predicted engine output torque being greater than all other predetermined weighting values for the other y values ($Q_y$); each set of possible command values including a possible commanded wastegate opening area, a possible commanded throttle opening area, a possible commanded EGR valve opening area, a possible commanded intake cam phase angle, and a possible commanded exhaust cam phase angle; the selected set of possible command values including a selected commanded wastegate opening area, a selected commanded throttle opening area, a selected commanded EGR valve opening area, a selected commanded intake cam phase angle, and a selected commanded exhaust cam phase angle; a boost actuator module configured to adjust the wastegate opening area based on the selected commanded wastegate opening area; a throttle actuator module configured to adjust the throttle opening area based on the selected commanded throttle opening area; an EGR actuator module configured to adjust the EGR valve opening area based on the selected commanded EGR valve opening area; a phase actuation module configured to adjust the intake cam phase angle based on the selected commanded intake cam phase angle; the phase actuation module being further configured to adjust the exhaust cam phase angle based on the selected commanded exhaust cam phase angle; and the plurality of requested values including at least a requested wastegate opening area, a requested throttle opening area, a requested EGR valve opening area, a requested intake cam phase angle, and a requested exhaust cam phase angle.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
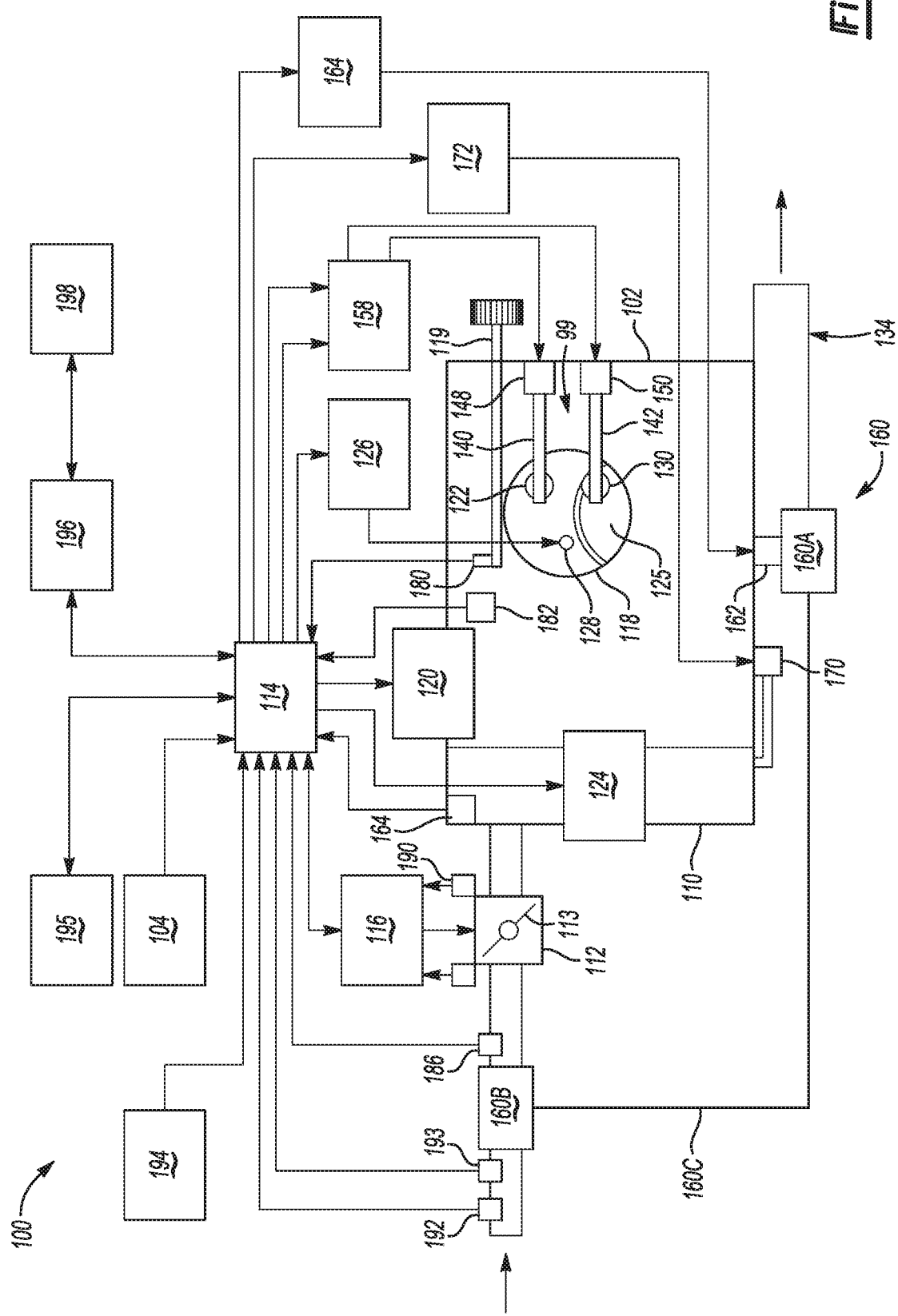
FIG. 1 is a schematic block diagram of an exemplary propulsion system, according to the principles of the present disclosure.

Referring now to FIG. 1, a functional block diagram of an exemplary propulsion system 100 is presented. The propulsion system 100 includes a spark ignition internal combustion engine 102 that combusts an air/fuel mixture to produce drive torque for a motor vehicle (not illustrated) based on driver input from a driver input module 104.

The internal combustion engine 102 includes an intake manifold 110 into which air is drawn through a throttle valve 112. The throttle valve 112 typically includes a throttle plate 113 that is movable to define a selectively variable throttle opening area. An engine control module (ECM) 114, which will be described in greater detail below, controls a throttle actuator module 116, which regulates the opening of the throttle plate 113 within the throttle valve 112 to control the amount of air drawn into the intake manifold 110 through the throttle opening area. Thus, the throttle valve 112 is configured to control an amount of air drawn into the intake manifold 110 through a selectively variable throttle valve opening area.

The engine 102 defines a plurality of piston-cylinder assemblies 99, one of which is illustrated in FIG. 1. Each piston-cylinder assembly 99 includes a piston 125 slidably disposed in a cylinder bore 118. The engine 102 may include 3, 4, 5, 6, 8, 10 or 12 piston-cylinder assemblies 99, by way of example. Air from the intake manifold 110 is drawn into the plurality of cylinders 118 of the engine 102. The ECM 114 may instruct a cylinder actuator module 120 to selectively deactivate some of the cylinders 118, which may improve fuel economy under certain engine operating conditions.

The engine 102 operates using a four-stroke cycle. The four strokes are referred to as the intake stroke, the compression stroke, the combustion stroke, and the exhaust stroke. During each revolution of a crankshaft 119 (schematically illustrated), two of the four strokes occur within the cylinder 118. Therefore, two crankshaft revolutions are necessary for the piston-cylinder assembly 99 to complete a full, four stroke combustion cycle.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders 118. Alternatively, fuel may be injected directly into the cylinders 118 or into mixing chambers associated with the cylinders 118. The fuel actuator module 124 terminates injection of fuel to cylinders that are deactivated.

The injected fuel mixes with air and creates an air/fuel mixture in the cylinder 118. During the compression stroke, the piston 125 within the cylinder 118 compresses the air/fuel mixture. A spark actuator module 126 energizes a spark plug 128 in the cylinder 118 based on a signal from the ECM 114, which ignites the air/fuel mixture.

The spark actuator module 126 is controlled by a timing signal specifying how far before or after the top dead center (TDC) position of the piston 125 to generate the spark. Because piston position is directly related to crankshaft rotation, operation of the spark actuator module 126 is preferably synchronized with the crankshaft angle. The spark actuator module 126 has the ability to constantly vary the timing signal for the spark relative to top dead center of the piston 125. The spark actuator module 126 may halt provision of spark to deactivated cylinders.

During the combustion stroke, the combustion of the air/fuel mixture drives the piston 125 away from TDC, thereby driving the crankshaft 119. Thus, the crankshaft 119 is rotatable to provide a drive torque to propel the motor vehicle, wherein the piston-cylinder assembly 99 is configured to combust the air/fuel mixture to rotate the crankshaft 119. The combustion stroke may be defined as the time between the piston 125 reaching TDC and the time at which the piston 125 reaches a bottom dead center (BDC).

During the exhaust stroke, the piston 125 begins moving away from BDC and expels the products of combustion (exhaust gases) through an exhaust valve 130. Thus, the exhaust valve 130 is configured to expel the exhaust gases from the piston-cylinder assembly 99. The products of combustion are exhausted from the vehicle through an exhaust system 134.

The intake valve 122 is controlled by an intake camshaft 140, while the exhaust valve 130 is controlled by an exhaust camshaft 142. Thus, the intake camshaft 140 is configured to be rotated to control the intake valve 122, and the exhaust camshaft 142 is configured to be rotated to control the exhaust valve 130. It should be understood that the intake camshaft 140 or multiple intake camshafts 140 will typically control a plurality of intake valves 122 associated with one or more cylinders 118 in one or more cylinder banks. Likewise, the exhaust camshaft 142 or multiple exhaust camshafts 142 will typically control a plurality of exhaust valves 130 associated with one or more cylinders 118 in one or more cylinder banks. It should also be understood that the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened and closed with respect to piston TDC is varied by an intake cam phaser 148. For example, the intake cam phaser 148 may be configured to control rotation of the intake camshaft 140 by controlling an intake cam phase angle of the intake camshaft 140. Correspondingly, the time when the exhaust valve 130 is opened and closed with respect to piston TDC is varied by an exhaust cam phaser 150. The exhaust cam phaser 150 may be configured to control rotation of the exhaust camshaft 142 by controlling an exhaust cam phase angle of the exhaust camshaft 142. A phaser actuator module 158 controls the intake cam phaser 148 and the exhaust cam phaser 150 based on signals from the ECM 114. Optionally, variable valve lift may also be controlled by the phaser actuator module 158.

The propulsion system 100 may include a turbocharger 160 that includes a turbine 160A powered by hot exhaust gases flowing through the exhaust system 134. The turbocharger 160 also includes an air compressor 160B that is driven by the turbine 160A. The compressor 160B compresses air leading into the throttle valve 112. Thus, the turbocharger 160 is configured to deliver compressed air to the throttle valve 112. The turbine 160A and the compressor 160B are coupled by a rotating member such as a shaft 160C. Although shown separated in FIG. 1, the turbine 160A and the compressor 160B may be adjacent and attached to each other. Alternatively, a supercharger (not illustrated), driven by the engine crankshaft 119, may be used to compress air, for example, from the throttle valve 112, and deliver it to the intake manifold 110.

A wastegate 162, disposed in parallel with the turbine 160A of the turbocharger 160, is configured to allow at least a portion of the exhaust gases to bypass the turbine 160A through a selectively variable wastegate opening area, thereby reducing the boost, i.e., the amount of intake air compression, provided by the turbocharger 160. A boost actuator module 164 controls the boost of the turbocharger 160 by controlling opening of the wastegate 162. It should be understood that two or more turbochargers 160 and wastegates 162 may be utilized and controlled by the boost actuator module 164.

The propulsion system 100 also includes an exhaust gas recirculation (EGR) valve 170, which is configured to selectively redirect a portion of the exhaust gases back to the intake manifold 110 through a selectively variable EGR valve opening area. The EGR valve 170 may be located upstream of the turbocharger's turbine 160A. The EGR valve 170 is controlled by an EGR actuator module 172 based on signals from the ECM 114.

The position of the crankshaft 119 is measured using a crankshaft position sensor 180. The rotational speed of the crankshaft 119, which is also the rotational speed of the engine 102, may be determined based on the crankshaft position. The temperature of the engine coolant is measured by an engine coolant temperature (ECT) sensor 182. The ECT sensor 182 is preferably located within the engine 102 or at another location where the coolant is circulated, such as a radiator (not illustrated).

The pressure within the intake manifold 110 is measured using a manifold absolute pressure (MAP) sensor 184. Optionally, engine vacuum, which is the difference between ambient air pressure and the pressure within the intake manifold 110, may be measured. The mass flow rate of air flowing into the intake manifold 110 is measured using a mass air flow (MAF) sensor 186.

The throttle actuator module 116 monitors the real-time position of the throttle valve 112 using one or more throttle position sensors (TPS) 190. The ambient temperature of air being drawn into the engine 102 is measured by an intake air temperature (TAT) sensor 192. The ambient humidity of air being drawn into the engine 102 is measured by an intake air humidity (IAH) sensor 193. The propulsion system 100 may also include additional sensors 194, such as one or more knock sensors, a compressor outlet pressure sensor, a throttle inlet pressure sensor, a wastegate position sensor, an EGR position sensor, as well as other suitable sensors. The signals (outputs) from all such sensors are provided to the ECM 114 to make control decisions for the propulsion system 100.

The ECM 114 communicates with a transmission control module 195 to coordinate shifting gears in a transmission (not illustrated). For example, the ECM 114 may reduce engine torque during a gear shift. The ECM 114 communicates with a hybrid control module 196 to coordinate operation of the engine 102 with an electric motor 198, if an electric motor 198 is included. The electric motor 198 typically also functions as a generator and may be used to produce electrical energy for use by vehicle electrical systems or for storage in a battery.

Each system that varies an engine parameter is referred to as an engine actuator. For example, the throttle actuator module 116 adjusts the opening of the throttle valve 112 to achieve a target throttle opening area. The spark actuator module 126 controls spark timing to achieve a target spark timing relative to piston TDC. The fuel actuator module 124 controls the fuel injectors to achieve target fueling parameters. The phaser actuator module 158 controls the intake and exhaust cam phasers 148 and 150 to achieve target intake and exhaust cam phase angles, respectively. The EGR actuator module 172 controls the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values, or command values, for the engine actuators to cause the engine 102 to generate a target engine output torque. The ECM 114 generates the command values for the engine actuators using model predictive control, as discussed in detail below.

Figure 2:
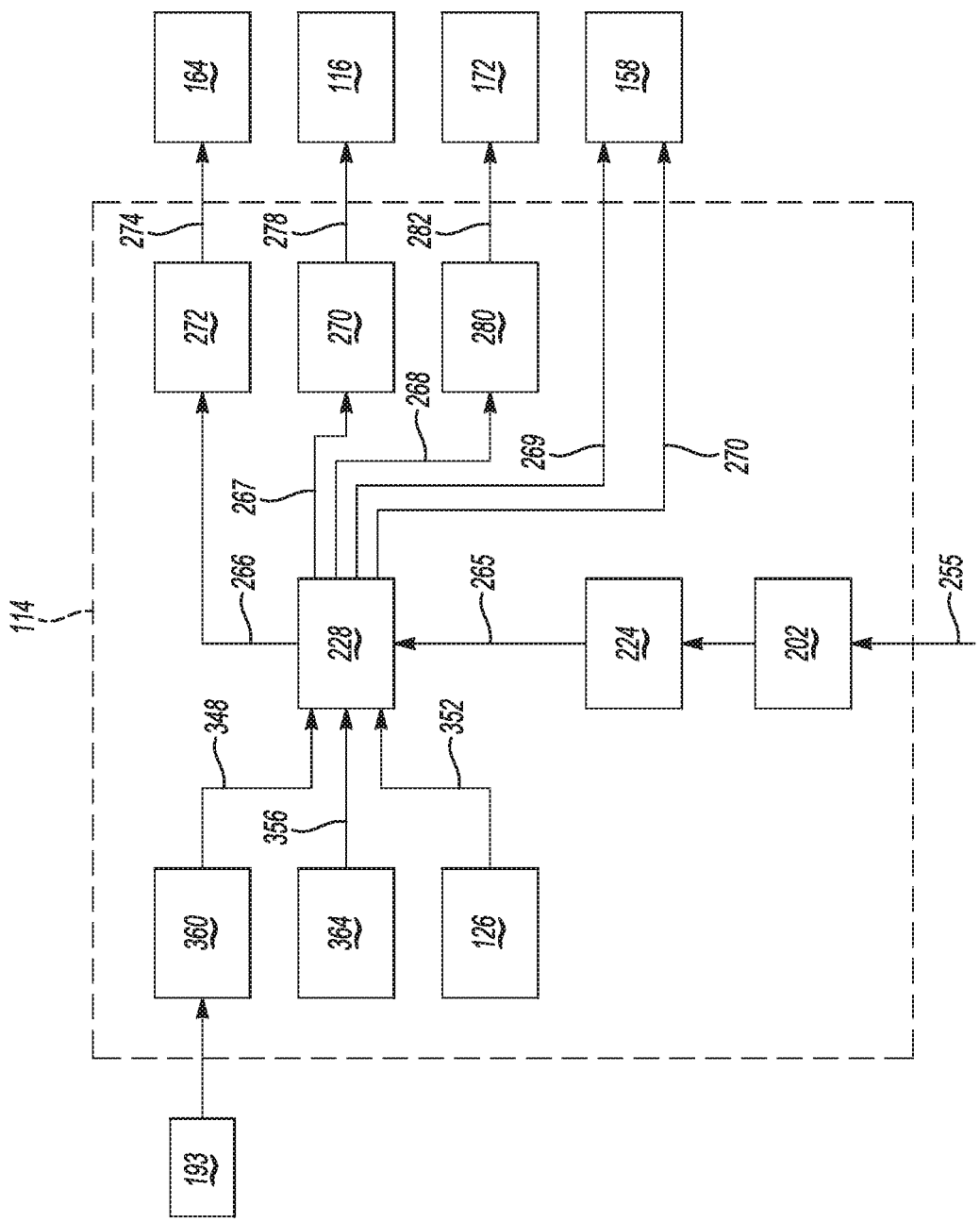
FIG. 2 is a schematic block diagram of a portion of the exemplary propulsion system of FIG. 1, showing additional details of an engine control module (ECM), in accordance with the principles of the present disclosure.

Referring now to FIG. 2, a functional block diagram of the engine control module (ECM) 114 is presented. The ECM 114 includes a driver torque module 202, a torque requesting module 224, and an air control module 228.

The driver torque module 202 determines a driver torque request 254 based on a driver input 255 from the driver input module 104 illustrated in FIG. 1. The driver input 255 is based on, for example, the position of an accelerator pedal and the position of a brake pedal. The driver input 255 may also or alternatively be based on a cruise control setting, or an adaptive cruise control system that varies vehicle speed to maintain a predetermined following distance.

The torque requesting module 224 determines an air torque request 265 based on the driver torque request 254. The air torque request 265 may be a brake torque.

Command values, or target values, for airflow-controlling engine actuators are determined based on the air torque request 265. More specifically, based on the air torque request 265, the air control module 228 determines a commanded waste gate opening area 266, a commanded throttle opening area 267, a commanded EGR valve opening area 268, a commanded intake cam phase angle 269, and a commanded exhaust cam phase angle 270 using model predictive control, as discussed in detail below with respect to FIGS. 2 and 3.

Figure 3:
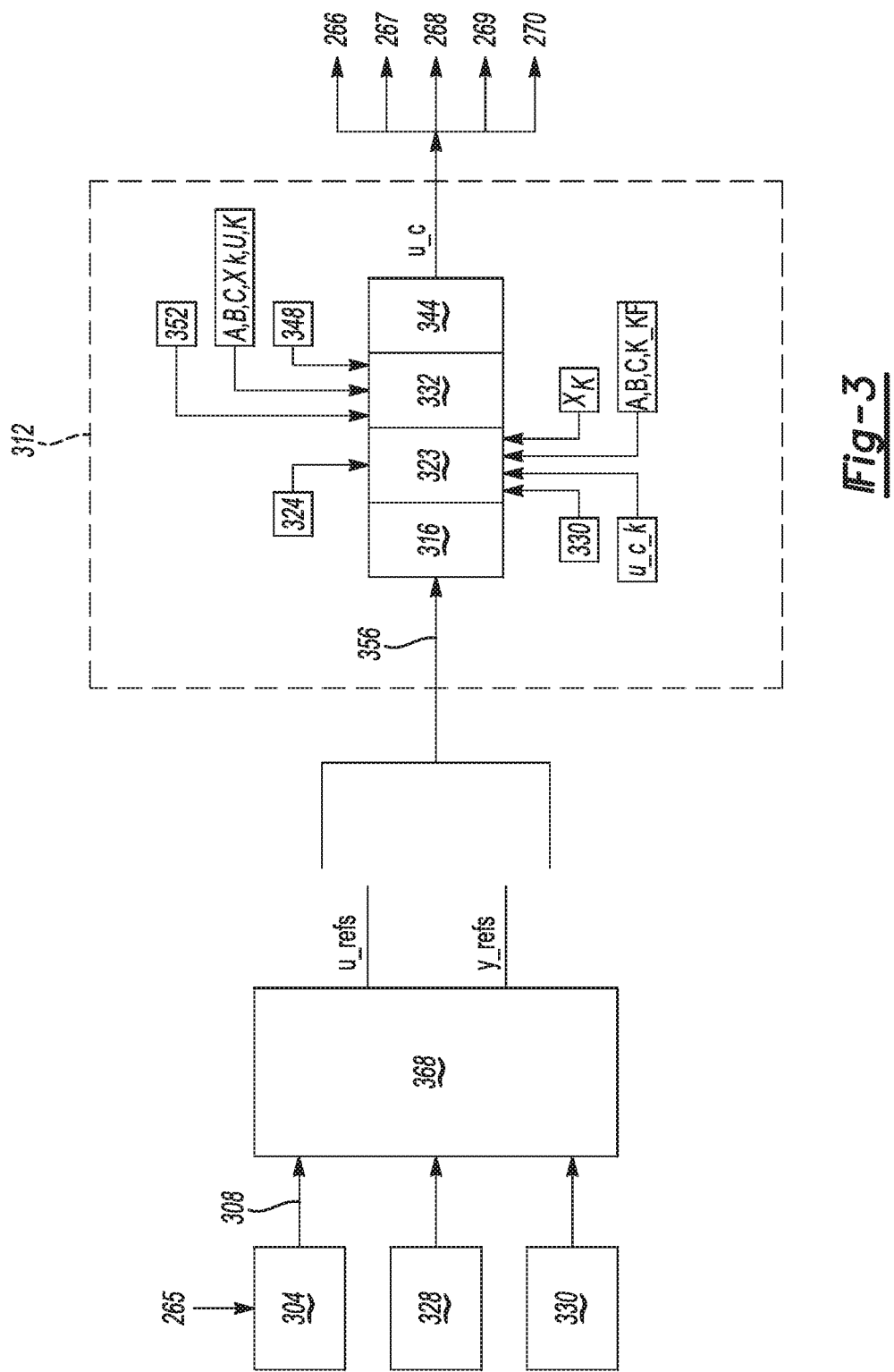
FIG. 3 is a schematic block diagram of a portion of the propulsion system of FIGS. 1 and 2, illustrating an MPC module, according to principles of the present disclosure.

Referring now to FIGS. 2 and 3, the air control module 228 includes a torque conversion module 304 which receives the air torque request 265 which, as discussed above, may be a brake torque. The torque conversion module 304 converts the air torque request 265 into base torque. Base torque refers to torque at the crankshaft 119 generated during operation of the engine 102 on a dynamometer while the engine 102 is at operating temperature and no torque loads are imposed on the engine 102 by accessories, such as an alternator or an air conditioning compressor. The torque conversion module 304 converts the air torque request 265 into a base air torque request 308, for example, using a mapping or a function that relates brake torques to base torques. The torque request resulting from conversion into base torque will be referred to as a base air torque request 308.

A model predictive control (MPC) module 312 controls a plurality of controlled variables ("u" variables) while tracking a plurality of tracked variables ("y" variables) that are affected by the controlled variables. The MPC module 312, therefore, generates command values 266-270 for the controlled variables using a model predictive control scheme. The MPC module 312 uses model predictive control and may also be referred to as a quadratic programming solver, such as a Dantzig QP solver. In the illustrated example, the command values are: commanded wastegate opening area 266, commanded throttle opening area 267, commanded EGR valve opening area 268, commanded intake cam phase angle 269, and commanded exhaust cam phase angle 270, which are commands for the controlled variables of wastegate opening area, throttle opening area, EGR valve opening area, intake cam phase angle, and exhaust cam phase angle.

The tracked variables may include engine output torque (or base torque), air-per-cylinder (APC), amount of external dilution, amount of internal dilution, crankshaft angle (may be with respect to CA50), and a combustion quality value, such as coefficient of variation. In this context, dilution refers to an amount of exhaust from a prior combustion event trapped within a cylinder 118 for a combustion event. External dilution refers to exhaust provided for a combustion event via the EGR valve 170. Residual dilution (also referred to as internal dilution) refers to exhaust that remains in a cylinder 118 or exhaust that is pushed back into the cylinder 118 following the exhaust stroke of a combustion cycle. Combustion phasing refers to a crankshaft position where a predetermined amount of fuel injected is combusted within a cylinder 118 relative to a predetermined crankshaft position for combustion of the predetermined amount of injected fuel. For example, combustion phasing may be expressed in terms of crankshaft angle relative to a predetermined CA50. CA50 refers to a crankshaft angle (CA) where 50 percent of a mass of injected fuel has been combusted within a cylinder 118. The predetermined CA50 corresponds to a crankshaft angle where a maximum amount of work is produced from the fuel injected and is about 8.5 to about 10 degrees after TDC in various implementations. While combustion phasing will be discussed in terms of crankshaft angle values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

A reference generator 368, which may be a steady state optimizer module, is provided to determine reference values 356 (desired or requested values) for the "u" variables (controlled variables) ("u_refs") and the "y" variables (the optimized output variables that may be tracked) ("y_refs"). The u_refs and the y_refs are values that are desirable during a steady state. Other modules of the MPC module 312, described below, optimize the trajectory, particularly of the y variables, or tracked variables, during the transient from one steady state to another.

The reference generator 368 is configured to generate reference or requested values 356 for each of the y-variables and the u-variables, e.g., u_refs and y_refs. In this example, the u_refs include a requested wastegate opening area WGO_r, a requested EGR valve opening area EGRO_r, a requested throttle opening area TO_r, a requested intake cam phase angle ICPA_r, and a requested exhaust cam phase angle ECPA_r, while the y_refs may include a requested air-per-cylinder APC_r, a requested amount of external dilution Dil_ext_r, a requested amount of internal dilution Dil_res_r, a requested crankshaft angle CA_r (which may be identified with respect to a predetermined CA50 value), a requested coefficient of variation COV_r (a combustion quality metric), and a requested engine output torque Te_r (which may be equal to the determined base torque 308).

Ancillary inputs 328 provide parameters that are not directly affected by the throttle valve 112, the EGR valve 170, the turbocharger 160, the intake cam phaser 148, and the exhaust cam phaser 150, but which may be used by the reference generator 368 or the MPC module 312. The ancillary inputs 328 may include engine speed, turbocharger inlet air pressure, IAT, or one or more other parameters. Feedback inputs 330 may include actual measured, estimated, or calculated values for the tracked variables, also referred to as y_m's, as well as other parameters. For example, the feedback inputs 330 may include an estimated torque output of the engine 102, an exhaust pressure downstream of the turbine 160A of the turbocharger, the IAT, an APC of the engine 102, an estimated residual dilution, an estimated external dilution, and other suitable parameters. The feedback inputs 330 may be measured using sensors (e.g., the IAT 192) or estimated based on one or more other parameters.

Once the requested values, or reference values 356, are determined, the reference generator 368 outputs them (the u_refs and the y_refs) to a command generator module 316 of the MPC module 312, which may be a sequence determination module. The command generator module 316 determines possible sequences of the command values 266-270 that could be used together during N future control loops. Each of the possible sequences identified by the command generator module 316 includes one sequence of N values for each of the command values 266-270. In other words, each possible sequence includes a sequence of N values for the commanded wastegate opening area 266, a sequence of N values for the commanded throttle opening area 267, a sequence of N values for the commanded EGR valve opening area 268, a sequence of N values for the commanded intake cam phase angle 269, and a sequence of N values for the commanded exhaust cam phase angle 270. Each of the N values are for a corresponding one of the N future control loops. N is an integer greater than or equal to one.

A prediction module 323 determines predicted responses of the engine 102 to the possible sequences of the command values 266-270, based on a mathematical model 324 of the engine 102, the ancillary inputs 328, and the feedback inputs 330. The model 324 may be, for example, a function or a mapping based on characteristics of the engine 102. The prediction module 323 may also be referred to as a state observer, which uses a Kalman filter. More specifically, based on a possible sequence of the command values 266-270, the ancillary inputs 328, and the feedback inputs 330, using the model 324, the prediction module 323 generates a sequence of predicted torques of the engine 102 for the N control loops, a sequence of predicted air-per-cylinder values (APCs) for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops.

For example, the prediction module 323 is configured to generate a first set of predicted y-variable values based on a first set of possible command values. The prediction module 323 is further configured to generate at least a second set of predicted y-variable values based on a second set of possible command values. In practice, a much larger number of predicted values may be generated based on additional sets of possible command values (third, fourth, fifth, etc. sets of possible command values).

The MPC module 312 contains a cost module 332 that is configured to determine a first cost for the first set of possible command values based on a plurality of predetermined weighting values, the first set of predicted values, and the requested values. Similarly, the cost module 332 is configured to determine a second cost for the second set of possible command values based on the plurality of predetermined weighting values, the second set of predicted values, and the requested values. Likewise, many more additional costs may be determined based on additional sets of predicted values and command values, in order to optimize for the lowest cost.

The cost for each set of possible command values of the plurality of sets of possible command values may be calculated with the following cost equation:

$$\text{Cost} = \sum (y(i|k) - y_{ref})^T Q_Y (y(i|k) - y_{ref}) + \\ (u(i|k) - u_{ref})^T Q_U (u(i|k) - u_{ref}) + \Delta u(i|k)^T Q_{\Delta u} \Delta u(i|k) \quad (1)$$

$$y = \begin{bmatrix} Te\_p \\ APC\_p \\ Dil\_ext\_p \\ Dil\_res\_p \\ CA\_p \\ COV\_p \end{bmatrix}$$

$$y_{ref} = \begin{bmatrix} Te\_r \\ APC\_r \\ Dil\_ext\_r \\ Dil\_res\_r \\ CA\_r \\ COV\_r \end{bmatrix}$$

$$u = \begin{bmatrix} WGO\_c \\ EGRO\_c \\ TO\_c \\ ICPA\_c \\ ECPA\_c \end{bmatrix}$$

$$u_{ref} = \begin{bmatrix} WGO\_r \\ EGRO\_r \\ TO\_r \\ ICPA\_r \\ ECPA\_r \end{bmatrix}$$

where Te_p=predicted engine output torque; APC_p=predicted APC; Dil_ext_p=predicted amount of external dilution; Dil_res_p=predicted amount of internal dilution; CA_p=predicted crankshaft angle, with respect to a predetermined CA50 value; COV_p=predicted coefficient of variation; Te_r=requested engine output torque; APC_r=requested APC; Dil_ext_r=requested amount of external dilution; Dil_res_r=requested amount of internal dilution; CA_r=requested crankshaft angle with respect to the predetermined CA50 value; COV_r=requested coefficient of variation; WGO_c=commanded wastegate opening area; EGRO_c=commanded EGR valve opening area; TO_c=commanded throttle opening area; ICPA_c=commanded intake cam phase angle; ECPA_c=commanded exhaust cam phase angle; WGO_r=requested wastegate opening area; EGRO_r=requested EGR valve opening area; TO_r=requested throttle opening area; ICPA_r=requested intake cam phase angle; ECPA_r=requested exhaust cam phase angle; $Q_y$=a predetermined weighting value for each y value; $Q_u$=a predetermined weighting value for each u value; $Q_{\Delta u}$=a predetermined weighting value for a rate of change of each u value; i=an index value; k=a prediction step; and T=a transposed vector.

The prediction module 332 may use equations such as the following to determine the predicted values:

$$y_k = C * x_k + w \quad (2)$$

$$y_{k+1} = C * x_{k+1} + w \quad (3)$$

$$x_{k+1} = A * x_k + B * u_k + v + K_{KF} * (y_k - y_{mk}) \quad (4)$$

$$y_k = \begin{bmatrix} Te\_p_k \\ APC\_p_k \\ Dil\_ext\_p_k \\ Dil\_res\_p_k \\ CA\_p_k \\ COV\_p_k \end{bmatrix}$$

$$y_{k+1} = \begin{bmatrix} Te\_p_{k+1} \\ APC\_p_{k+1} \\ Dil\_ext\_p_{k+1} \\ Dil\_res\_p_{k+1} \\ CA\_p_{k+1} \\ COV\_p_{k+1} \end{bmatrix}$$

$$u_k = \begin{bmatrix} WGO\_c_k \\ EGRO\_c_k \\ TO\_c_k \\ ICPA\_c_k \\ ECPA\_c_k \end{bmatrix}$$

$$y_{mk} = \begin{bmatrix} Te\_m_k \\ APC\_m_k \\ Dil\_ext\_m_k \\ Dil\_res\_m_k \\ CA\_m_k \\ COV\_m_k \end{bmatrix}$$

where A=a state (or transmission) matrix; B=an input matrix; C=an output (or measured) matrix; $Te\_p_k$=predicted actual engine output torque at the prediction step k; $APC\_p_k$=predicted actual air-per-cylinder at the prediction step k; $Dil\_ext\_p_k$=predicted actual amount of external dilution at the prediction step k; $Dil\_res\_p_k$=predicted actual amount of internal dilution at the prediction step k; $CA\_p_k$=predicted actual crankshaft angle, with respect to a CA50 point, at the prediction step k; $COV\_p_k$=predicted actual coefficient of variation at the prediction step k; $x_k$=state variable at the prediction step k; $Te\_p_{k+1}$=predicted actual engine output torque at the prediction step k+1; $APC\_p_{k+1}$=predicted actual air-per-cylinder at the prediction step k+1; $Dil\_ext\_p_{k+1}$=predicted actual amount of external dilution at the prediction step k+1; $Dil\_res\_p_{k+1}$=predicted actual amount of internal dilution at the prediction step k+1; $CA\_p_{k+1}$=predicted actual crankshaft angle, with respect to a CA50 point, at the prediction step k+1; $COV\_p_{k+1}$=predicted actual coefficient of variation at the prediction step k+1; $x_{k+1}$=state variable at the prediction step k+1; $WGO\_c_k$=commanded wastegate opening area at the prediction step k; $EGRO\_c_k$=commanded EGR valve opening at the prediction step k; $TO\_c_k$=commanded throttle opening area at the prediction step k; $ICPA\_c_k$=commanded intake cam phase angle at the prediction step k; $ECPA\_c_k$=commanded exhaust cam phase angle at the prediction step k; $K_{KF}$=a Kalman filter gain; $Te\_m_k$=measured actual engine output torque at the prediction step k; $APC\_m_k$=measured actual air-per-cylinder at the prediction step k; $Dil\_ext\_m_k$=measured actual amount of external dilution at the prediction step k; $Dil\_res\_m_k$=measured actual amount of internal dilution at the prediction step k; $CA\_m_k$=measured actual crankshaft angle, with respect to a CA50 point, at the prediction step k; $COV\_m_k$=measured actual coefficient of variation at the prediction step k; v=process noise; and w=measurement noise. The prediction step k is a prediction step at the current time (e.g., now), and the prediction step k+1 is a prediction one step ahead. Though the "m" values are described as "measured," these values could alternatively be determined in another way, such as by indirect measurement or by estimation.

Measured values, such as $Te\_m_k$, $ACP\_m_k$, $Dil\_ext\_m_k$, $Dil\_res\_m_k$, $CA\_m_k$, $COV\_m_k$ may be measured, such as with a sensor, or these values could alternatively be determined in another way, such as by indirect measurement or by estimation. For example, the engine output torque Te_m may be sensed from an engine torque sensor and the crankshaft angle CA_m may be determined using the crankshaft position sensor 180.

The constants, matrices, and gain referred to above, including A, B, C, $K_{KF}$, $Q_y$, $Q_u$, $Q_{\Delta u}$, are parameters of the system determined through testing, physical models, or other means. In some variations, a system identification procedure is run offline, for example, during a calibration, to identify the constants, matrices, and gain, and also to define initial u and y values, $u_0$ and $y_0$. Once $u_0$ and $y_0$ are known, then $x_0$ can be computed from the prediction module equations (e.g., equations (2)-(4) or a subset thereof). Thereafter, each of the prediction module 323 and cost module 332 equations (e.g., equations (1)-(4) or a subset thereof) can be run to obtain initial values offline. Then, the MPC module 312 can be run online to constantly optimize the controlled parameters u_c as the vehicle is running through steady state and transient states. The constants allow the cost to be determined based on the relationship between and relative importance of each of the commanded u values and the tracked y values. The relationships are weighted to control the effect that each relationship has on the cost.

The MPC module 312 may also include a selection module 344 configured to select one of the plurality of sets of possible command values based on the lowest of the determined costs. Thus, the selection module 344 selects one of the possible sequences of the command values 266-270 based on the costs of the possible sequences, respectively. For example, the selection module 344 may select the possible sequence having the lowest cost while satisfying actuator constraints 348 and output constraints 352.

The MPC module 312 determines the command values 266-270 using a quadratic programming (QP) solver, such as a Dantzig QP solver. For example, the MPC module 312 may generate a surface of cost values for the possible sequences of the command values 266-270 and, based on the slope of the cost surface, identify a set of possible command values having the lowest cost. The MPC module 312 then tests that set of possible command values 266-270 to determine whether that set of possible command values 266-270 will satisfy the actuator constraints 348 and the output constraints 352. The MPC module 312 selects the set of possible command values 266-270 having the lowest cost while satisfying the actuator constraints 348 and the output constraints 352.

The boost actuator module 164 controls the wastegate 162 to achieve the commanded wastegate opening area 266. For example, a first conversion module 272 converts the commanded wastegate opening area 266 into a commanded duty cycle 274 to be applied to the wastegate 162, and the boost actuator module 164 applies a signal to the wastegate 162 based on the commanded duty cycle 274. Alternatively, the first conversion module 272 converts the commanded wastegate opening area 266 into a commanded wastegate position, and converts the commanded wastegate position into the commanded duty cycle 274.

The throttle actuator module 116 controls the throttle valve 112 to achieve the commanded throttle opening area 267. For example, a second conversion module 276 converts the commanded throttle opening area 267 into a commanded duty cycle 278 to be applied to the throttle valve 112, and the throttle actuator module 116 applies a signal to the throttle valve 112 based on the commanded duty cycle 278. Alternatively, the second conversion module 276 converts the commanded throttle opening area 267 into a commanded throttle position, and converts the commanded throttle position into the target duty cycle 278.

The EGR valve actuator module 172 controls the EGR valve 170 to achieve the commanded EGR valve opening area 268. For example, a third conversion module 280 converts the commanded EGR valve opening area 268 into a commanded duty cycle 282 to be applied to the EGR valve 170, and the EGR actuator module 172 applies a signal to the EGR valve 170 based on the commanded duty cycle 282. Alternatively, the third conversion module 280 converts the commanded EGR opening area 268 into a commanded EGR position, and converts the commanded EGR position into the commanded duty cycle 282.

The phaser actuator module 158 controls both the intake cam phaser 148 to achieve the commanded intake cam phase angle 269 and the exhaust cam phaser 150 to achieve the commanded exhaust cam phase angle 270. Alternatively, a fourth conversion module (not illustrated) may be included to convert the commanded intake and exhaust cam phase angles into commanded intake and exhaust duty cycles which are applied to the intake and exhaust cam phasers 148 and 150, respectively. The air control module 228 may also determine a commanded overlap factor and a commanded effective displacement and the phaser actuator module 158 may control the intake and exhaust cam phasers 148 and 150 to achieve the commanded overlap factor and the commanded effective displacement.

The cost module 332 may determine the cost for the possible sequences of the command values 266-270 based on relationships between: the predicted torque and the base air torque request 308; the predicted APC and zero; the possible command values 266-270 and the respective actuator constraints 348; the other predicted parameters and the respective output constraints 352; and the possible command values 266-270 and the respective reference values 356.

Satisfaction of the actuator constraints 348 and the output constraints 352 may be considered in the cost determination. In other words, the cost module 332 may determine the cost values further based on the actuator constraints 348 and the output constraints 352. As discussed in detail below, based on how the cost values are determined, the selection module 344 will select the one of the possible sequences that best achieves the base air torque request 208 while minimizing the APC, subject to the actuator constraints 348 and the output constraints 352.

An output constraint module 364 sets the output constraints 352 for the predicted torque output of the engine 102, the predicted APC, the predicted crankshaft angle, the predicted COV of IMEP, the predicted residual dilution, and the predicted external dilution. The output constraints 352 for each one of the predicted values may include a maximum value for an associated predicted parameter and a minimum value for that predicted parameter. For example, the output constraints 352 may include a minimum torque, a maximum torque, a maximum APC and a minimum APC (typically zero), a minimum crankshaft angle and a maximum crankshaft angle, a minimum COV of IMEP and a maximum COV of IMEP, a minimum residual dilution and a maximum residual dilution, and a minimum external dilution and a maximum external dilution.

The output constraint module 364 generally sets the output constraints 352 to predetermined ranges for the associated predicted parameters. However, the output constraint module 364 may vary one or more of the output constraints 352 under certain circumstances. For example, the output constraint module 364 may retard the maximum crankshaft angle, when knock occurs within the engine 102.

An actuator constraint module 360 sets actuator constraints 348 for each of the target values 266-270, including the throttle valve opening area of the throttle valve 112, the EGR valve opening area of the EGR valve 170, the wastegate opening area of the wastegate 162, the intake cam phase angle of the intake cam phaser 148, and the exhaust cam phase angle of the exhaust cam phaser 150.

Figure 4:
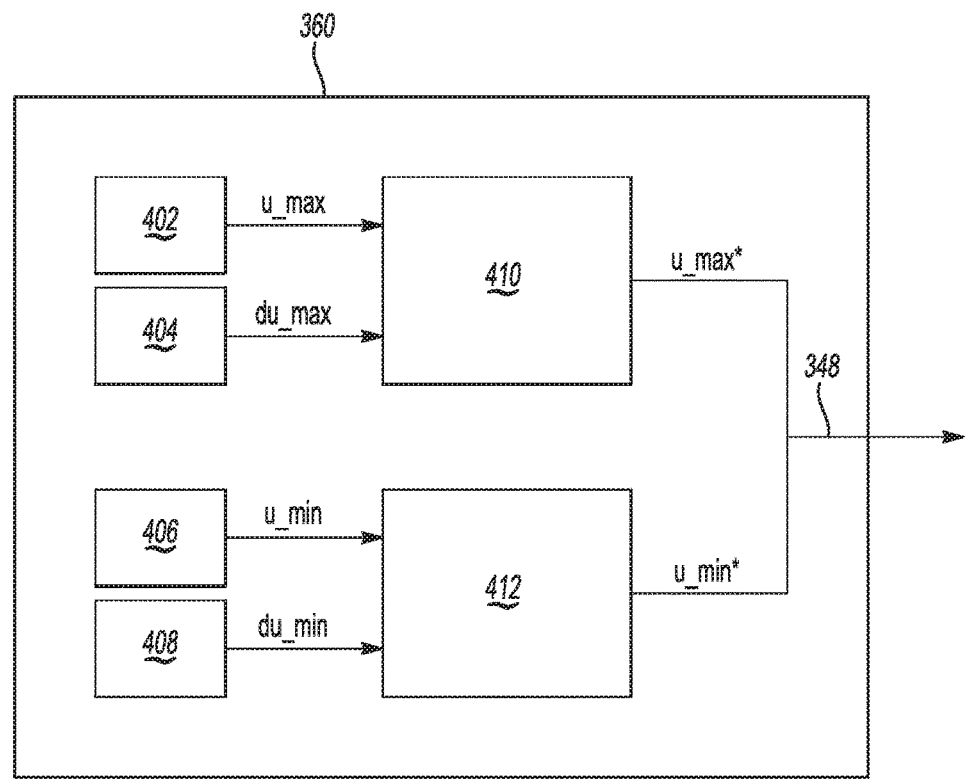
FIG. 4 is a schematic block diagram of a portion of the propulsion system of FIGS. 1-3, according to the principles of the present disclosure.

Referring now to FIG. 4, additional details of the actuator constraint module 360 are illustrated. The actuator constraint module 360 is a constraints consolidation module that is configured to generate a set of initial constraints in an upper limit module 402, and an upper rate-of-change module 404, a lower limit module 406, and a lower rate-of-change module 408.

The upper limit module 402 determines an upper limit, or u_max, for each of the controlled variables. For example, the upper limit module 402 determines upper limits for each of the wastegate opening area, the throttle opening area, the EGR valve opening area, the intake cam phase angle, and the exhaust cam phase angle. The upper limits u_max may be based on a number of vehicle and environmental factors.

The upper rate-of-change module 404 determines an upper rate-of-change limit, or du_max, for each of the controlled variables. For example, the upper rate-of-change module 404 determines upper rate-of-change limits for each of the wastegate opening area, the throttle opening area, the EGR valve opening area, the intake cam phase angle, and the exhaust cam phase angle. The upper rate-of-change limits du_max may be based on a number of vehicle and environmental factors.

The lower limit module 406 determines a lower limit, or u_min, for each of the controlled variables. For example, the lower limit module 406 determines lower limits for each of the wastegate opening area, the throttle opening area, the EGR valve opening area, the intake cam phase angle, and the exhaust cam phase angle. The lower limits u_min may be based on a number of vehicle and environmental factors. In some cases, the lower limit u_min may be zero.

The lower rate-of-change module 408 determines a lower rate-of-change limit, or du_min, for each of the controlled variables. For example, the lower rate-of-change module 408 determines lower rate-of-change limits for each of the wastegate opening area, the throttle opening area, the EGR valve opening area, the intake cam phase angle, and the exhaust cam phase angle. The lower rate-of-change limits du_min may be based on a number of vehicle and environmental factors. In some cases, the lower rate-of-change limit du_min may be zero.

From the modules 402 and 404, the upper limit u_max for each controlled variable u and the upper rate-of-change limit du_max for each controlled variable are output to an upper limit consolidation module 410. The upper limit consolidation module 410 consolidates the upper limit u_max with the upper rate-of-change limit du_max for each controlled variable u to create an upper consolidated constraint u_max* for each controlled variable u. For example, the upper limit for the wastegate opening area WGO_max is consolidated with the upper rate-of-change limit for the wastegate opening area ΔWGO_max; the upper limit for the throttle opening area TO_max is consolidated with the upper rate-of-change limit for the throttle opening area ΔTO_max; the upper limit for the EGR valve opening area EGRO_max is consolidated with the upper rate-of-change limit for the EGR valve opening area ΔEGRO_max, the upper limit for the intake cam phase angle ICPA_max is consolidated with the upper rate-of-change limit for the intake cam phase angle ΔICPA_max; and the upper limit for the exhaust cam phase angle ECPA_max is consolidated with the upper rate-of-change limit for the exhaust cam phase angle ΔECPA_max. The upper consolidated constraints u_max* are then sent as part of the actuator constraints 348 to the MPC module 312. Thus, u_max* is ultimately based on only one, but not both, of the u_max and the du_max constraint, which makes the solving of the cost equation simpler in the MPC module 312.

From the modules 406 and 408, the lower limit u_min for each controlled variable u and the lower rate-of-change limit du_min for each controlled variable are output to a lower limit consolidation module 412. The lower limit consolidation module 412 consolidates the lower limit u_min with the lower rate-of-change limit du_min for each controlled variable u to create a lower consolidated constraint u_min* for each controlled variable u. For example, the lower limit for the wastegate opening area WGO_min is consolidated with the lower rate-of-change limit for the wastegate opening area ΔWGO_min; the lower limit for the throttle opening area TO_min is consolidated with the lower rate-of-change limit for the throttle opening area ΔTO_min; the lower limit for the EGR valve opening area EGRO_min is consolidated with the lower rate-of-change limit for the EGR valve opening area ΔEGRO_min, the lower limit for the intake cam phase angle ICPA_min is consolidated with the lower rate-of-change limit for the intake cam phase angle ΔICPA_min; and the lower limit for the exhaust cam phase angle ECPA_min is consolidated with the lower rate-of-change limit for the exhaust cam phase angle ΔECPA_min. The lower consolidated constraints u_min* are then sent as part of the actuator constraints 348 to the MPC module 312. Thus, u_min* is ultimately based on only one, but not both, of the u_min and the du_min constraint, which makes the solving of the cost equation simpler in the MPC module 312.

The upper limit consolidation module 410 may be configured to determine the upper consolidated constraints u_max* for each controlled variable by, first, multiplying the upper rate-of-change constraint du_max by a time step duration k to determine an upper rate limit product du(k)_max for the respective controlled variable u. Next, the upper rate limit product du(k)_max for the respective controlled variable u can be added to the selected command value u for an immediate past time step k of the respective controlled variable to determine an upper rate-limit-based constraint RLB_max. For example:

$$RLB\_max = du(k) + u(k). \quad (5)$$

Third, the upper consolidated constraint u_max* for each controlled variable u can be determined by selecting the lesser of the upper limit u_max and the upper rate-limit-based constraint RLB_max. For example, $$u\_max^* = \min(u\_max, RLB\_max). \quad (6)$$

The lower limit consolidation module 412 may be configured to determine the lower consolidated constraints u_min* for each controlled variable u by, first, multiplying the lower rate-of-change constraint du_min by a time step duration k to determine a lower rate limit product du(k)_min for the respective controlled variable u. Next, the lower rate limit product du(k)_min for the respective controlled variable u can be subtracted from the selected command value u for an immediate past time step k of the respective controlled variable to determine a lower rate-limit-based constraint RLB_min. For example:

$$RLB\_min = u(k) - du(k). \quad (7)$$

Third, the lower consolidated constraint u_min* for each controlled variable u can be determined by selecting the greater of the lower limit u_min and the lower rate-limit-based constraint RLB_min. For example, $$u\_min^* = \max(u\_min, RLB\_min). \quad (8)$$

Therefore, the cost equation (e.g., equation (1)) may be subject to the following constraints: $u\_min^* \leq u\_c_k \leq u\_max^*$ for each controlled variable u without subjecting the cost equation to another set of du constraints. Similar consolidations of the constraints 352 for the tracked variables y may be performed, if desired. Thus, the number of constraints 348, 352 input to the MPC module 312 is significantly reduced, and accordingly, the computing time and power required to complete the MPC calculations is also reduced.

Figure 5:
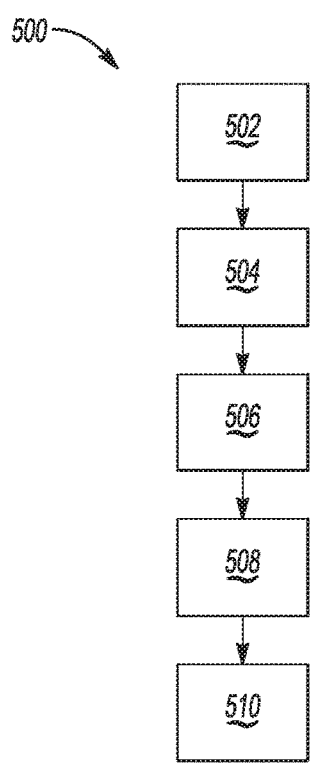
FIG. 5 is a block diagram presenting steps of a method of controlling a propulsion system, according to the principles of the present disclosure.

Referring to FIG. 5, the present disclosure also contemplates a method 500 for controlling a propulsion system of a motor vehicle, where the method 500 may be performed by any of the features of the propulsion system 100 or control system (such as the engine control module 114) described above. For example, the method 500 may include a step 502 of generating a plurality of sets of possible command values for a plurality of controlled variables and a step 504 of generating a set of initial constraints for the plurality of controlled variables. The set of initial constraints includes upper and lower limits for each controlled variable and upper and lower rate-of-change limits for each controlled variable. The method 500 also includes step 506 of generating a set of consolidated constraint limits for the plurality of controlled variables. Each consolidated constraint limit is determined by consolidating one of the upper and lower limits with one of the upper and lower rate-of-change limits. The consolidated constraint limits may be determined as described above with respect to equations (5)-(8), if desired. The method 500 further includes a step 508 of determining a cost for each set of possible command values and a step 510 of selecting the set of possible command values that has the lowest cost and falls within the set of consolidated constraint limits to define a set of selected command values. The set of selected command values includes a selected command value for each controlled variable.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The MPC module 312 or other modules of the described control system (e.g., engine control module 114) may be configured to execute each of the steps of the method 500. Thus, the entire description with respect to FIGS. 1-5 may be applied by the control system to effectuate the method 500 shown in FIG. 5. Furthermore, the control system may be or include a controller that includes a number of control logics that are configured to execute the steps of the method 500.

The controller(s) of the control system may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the disclosure as defined in the appended claims.

What is claimed is:

1. A method for controlling a propulsion system of a motor vehicle, the method comprising:
   generating a plurality of sets of possible command values for a plurality of controlled variables;
   generating a set of initial constraints for the plurality of controlled variables, the set of initial constraints including upper and lower limits for each controlled variable and upper and lower rate-of-change limits for each controlled variable;
   generating a set of consolidated constraint limits for the plurality of controlled variables, each consolidated constraint limit of the set of consolidated constraint limits being determined by consolidating one of the upper and lower limits with one of the upper and lower rate-of-change limits;
   determining a cost for each set of possible command values of the plurality of sets of possible command values; and
   selecting the set of possible command values of the plurality of sets of possible command values that has a lowest cost and falls within the set of consolidated constraint limits to define a set of selected command values, the set of selected command values including a selected command value for each controlled variable.

2. The method of claim 1, the set of consolidated constraint limits comprising an upper consolidated constraint limit for each controlled variable and a lower consolidated constraint limit for each controlled variable, the method further comprising:
   determining an upper rate-limit-based constraint for each controlled variable by:
      multiplying the upper rate-of-change limit for a respective controlled variable by a time step duration to determine an upper rate limit product for the respective controlled variable; and adding the upper rate limit product for the respective controlled variable to the selected command value for an immediate past time step of the respective controlled variable;

determining a lower rate-limit-based constraint for each controlled variable by:
multiplying the lower rate-of-change limit for a respective controlled variable by the time step duration to determine a lower rate limit product for the respective controlled variable; and
subtracting the lower rate limit product for the respective controlled variable from the selected command value for the immediate past time step of the respective controlled variable;

determining each upper consolidated constraint limit by selecting the lesser of the upper limit for the respective controlled variable and the upper rate-limit-based constraint for the respective controlled variable; and determining each lower consolidated constraint limit by selecting the greater of the lower limit for the respective controlled variable and the lower rate-limit-based constraint for the respective controlled variable.

3. The method of claim 2, further comprising controlling a vehicle parameter based on at least one command value of the selected set of command values.

4. The method of claim 3, wherein the cost is determined based on one, but not both, of the upper limit for a respective controlled variable and the upper rate-of-change limit for the respective controlled variable, the cost being determined based on one, but not both, of the lower limit for a respective controlled variable and the lower rate-of-change limit for the respective controlled variable, the method further comprising:
determining a plurality of requested values;
determining a plurality of predicted values; and
determining the cost for each set of possible command values of the plurality of sets of possible command values based on the plurality of requested values, the plurality of predicted values, and a plurality of weighting factors.

5. The method of claim 4, wherein the plurality of controlled variables includes a wastegate opening area, an EGR valve opening area, a throttle opening area, an intake cam phase angle, and an exhaust cam phase angle.

6. The method of claim 5, wherein the plurality of predicted values includes a predicted engine output torque, a predicted APC, a predicted amount of external dilution, a predicted amount of internal dilution, a predicted crankshaft angle, and a predicted combustion quality value.

7. The method of claim 6, the predicted combustion quality value being a predicted coefficient of variation, the method further comprising determining the cost for each set of possible command values of the plurality of sets of possible command values with the following cost equation:

$$\text{Cost} = \sum (y(i|k) - y_{ref})^T Q_Y (y(i|k) - y_{ref}) + (u(i|k) - u_{ref})^T Q_U (u(i|k) - u_{ref}) + \Delta u(i|k)^T Q_{\Delta u} \Delta u(i|k)$$

$$y = \begin{bmatrix} Te\_p \\ APC\_p \\ Dil\_ext\_p \\ Dil\_res\_p \\ CA\_p \\ COV\_p \end{bmatrix}$$

$$y_{ref} = \begin{bmatrix} Te\_r \\ APC\_r \\ Dil\_ext\_r \\ Dil\_res\_r \\ CA\_r \\ COV\_r \end{bmatrix}$$

$$u = \begin{bmatrix} WGO\_c \\ EGRO\_c \\ TO\_c \\ ICPA\_c \\ ECPA\_c \end{bmatrix}$$

$$u_{ref} = \begin{bmatrix} WGO\_r \\ EGRO\_r \\ TO\_r \\ ICPA\_r \\ ECPA\_r \end{bmatrix}$$

where
Te_p=the predicted engine output torque;
APC_p=the predicted APC;
Dil_ext_p=the predicted amount of external dilution;
Dil_res_p=the predicted amount of internal dilution;
CA_p=the predicted crankshaft angle, with respect to a predetermined CA50 value;
COV_p=the predicted coefficient of variation;
Te_r=a requested engine output torque;
APC_r=a requested APC;
Dil_ext_r=a requested amount of external dilution;
Dil_res_r=a requested amount of internal dilution;
CA_r=a requested crankshaft angle with respect to the predetermined CA50 value;
COV_r=a requested coefficient of variation;
WGO_c=a commanded wastegate opening area;
EGRO_c=a commanded EGR valve opening area;
TO_c=a commanded throttle opening area;
ICPA_c=a commanded intake cam phase angle;
ECPA_c=a commanded exhaust cam phase angle;
WGO_r=a requested wastegate opening area;
EGRO_r=a requested EGR valve opening area;
TO_r=a requested throttle opening area;
ICPA_r=a requested intake cam phase angle;
ECPA_r=a requested exhaust cam phase angle;
$Q_y$=a predetermined weighting value for each y value;
$Q_u$=a predetermined weighting value for each u value;
$Q_{\Delta u}$=a predetermined weighting value for a rate of change of each u value;
i=an index value;
k=a prediction step; and
T=a transposed vector.

8. The method of claim 7, wherein a predetermined weighting value for the predicted engine output torque is greater than all other predetermined weighting values for each y value ($Q_y$).

9. A control system for controlling a propulsion system of a motor vehicle having an internal combustion engine, the control system comprising:
a command generator module configured to generate a plurality of sets of possible command values for a plurality of controlled variables;

a constraints consolidation module configured to:
  generate a set of initial constraints for the plurality of controlled variables, the set of initial constraints including upper and lower limits for each controlled variable and upper and lower rate-of-change limits for each controlled variable; and
  generate a set of consolidated constraint limits for the plurality of controlled variables, each consolidated constraint limit of the set of consolidated constraint limits being determined by consolidating one of the upper and lower limits with one of the upper and lower rate-of-change limits;
a cost module configured to determine a cost for each set of possible command values of the plurality of sets of possible command values; and
a selection module configured to select the set of possible command values of the plurality of sets of possible command values that has a lowest cost and falls within the set of consolidated constraint limits to define a set of selected command values, the set of selected command values including a selected command value for each controlled variable.

10. The control system of claim 9, the set of consolidated constraint limits including an upper consolidated constraint limit for each controlled variable and a lower consolidated constraint limit for each controlled variable, the constraints consolidation module being configured to:
  determine an upper rate-limit-based constraint for each controlled variable by:
    multiplying the upper rate-of-change limit for a respective controlled variable by a time step duration to determine an upper rate limit product for the respective controlled variable; and
    adding the upper rate limit product for the respective controlled variable to the selected command value for an immediate past time step of the respective controlled variable;
  determine a lower rate-limit-based constraint for each controlled variable by:
    multiplying the lower rate-of-change limit for a respective controlled variable by the time step duration to determine a lower rate limit product for the respective controlled variable; and
    subtracting the lower rate limit product for the respective controlled variable from the selected command value for the immediate past time step of the respective controlled variable;
  determine each upper consolidated constraint limit by selecting the lesser of the upper limit for the respective controlled variable and the upper rate-limit-based constraint for the respective controlled variable; and
  determine each lower consolidated constraint limit by selecting the greater of the lower limit for the respective controlled variable and the lower rate-limit-based constraint for the respective controlled variable.

11. The control system of claim 10, further comprising an actuation module configured to control a vehicle parameter based on at least one command value of the selected set of command values.

12. The control system of claim 11, further comprising:
  a reference generator configured to determining a plurality of requested values; and
  a prediction module configured to determine a plurality of predicted values, the cost module being configured to determine the cost for each set of possible command values of the plurality of sets of possible command values based on the plurality of requested values, the plurality of predicted values, and a plurality of weighting factors.

13. The control system of claim 12, wherein the plurality of controlled variables includes a wastegate opening area, an EGR valve opening area, a throttle opening area, an intake cam phase angle, and an exhaust cam phase angle, and wherein the plurality of predicted values includes a predicted engine output torque, a predicted APC, a predicted amount of external dilution, a predicted amount of internal dilution, a predicted crankshaft angle, and a predicted combustion quality value.

14. The control system of claim 13, the predicted combustion quality value being a predicted coefficient of variation, wherein the cost module is configured to determine the cost for each set of possible command values of the plurality of sets of possible command values with the following cost equation:

$$\text{Cost} = \sum (y(i|k) - y_{ref})^T Q_Y (y(i|k) - y_{ref}) + (u(i|k) - u_{ref})^T Q_U (u(i|k) - u_{ref}) + \Delta u(i|k)^T Q_{\Delta u} \Delta u(i|k)$$

$$y = \begin{bmatrix} Te\_p \\ APC\_p \\ Dil\_ext\_p \\ Dil\_res\_p \\ CA\_p \\ COV\_p \end{bmatrix}$$

$$y_{ref} = \begin{bmatrix} Te\_r \\ APC\_r \\ Dil\_ext\_r \\ Dil\_res\_r \\ CA\_r \\ COV\_r \end{bmatrix}$$

$$u = \begin{bmatrix} WGO\_c \\ EGRO\_c \\ TO\_c \\ ICPA\_c \\ ECPA\_c \end{bmatrix}$$

$$u_{ref} = \begin{bmatrix} WGO\_r \\ EGRO\_r \\ TO\_r \\ ICPA\_r \\ ECPA\_r \end{bmatrix}$$

where
Te_p=the predicted engine output torque;
APC_p=the predicted APC;
Dil_ext_p=the predicted amount of external dilution;
Dil_res_p=the predicted amount of internal dilution;
CA_p=the predicted crankshaft angle, with respect to a predetermined CA50 value;
COV_p=the predicted coefficient of variation;
Te_r=a requested engine output torque;
APC_r=a requested APC;
Dil_ext_r=a requested amount of external dilution;
Dil_res_r=a requested amount of internal dilution;
CA_r=a requested crankshaft angle with respect to the predetermined CA50 value;

COV_r=a requested coefficient of variation;
WGO_c=a commanded wastegate opening area;
EGRO_c=a commanded EGR valve opening area;
TO_c=a commanded throttle opening area;
ICPA_c=a commanded intake cam phase angle;
ECPA_c=a commanded exhaust cam phase angle;
WGO_r=a requested wastegate opening area;
EGRO_r=a requested EGR valve opening area;
TO_r=a requested throttle opening area;
ICPA_r=a requested intake cam phase angle;
ECPA_r=a requested exhaust cam phase angle;
$Q_y$=a predetermined weighting value for each y value;
$Q_u$=a predetermined weighting value for each u value;
$Q_{\Delta u}$=a predetermined weighting value for a rate of change of each u value;
i=an index value;
k=a prediction step; and
T=a transposed vector.

15. A propulsion system for a motor vehicle, the propulsion system comprising:
an intake manifold having a throttle valve configured to control an amount of air drawn into the intake manifold through a selectively variable throttle opening area;
an internal combustion engine defining at least one piston-cylinder assembly including a piston slidably disposed within a cylinder bore;
a crankshaft rotatable to provide a drive torque to propel the motor vehicle, the piston-cylinder assembly configured to combust an air/fuel mixture to rotate the crankshaft;
an intake valve configured to draw air into the piston-cylinder assembly from the intake manifold;
an intake camshaft configured to be rotated to control the intake valve;
an intake cam phaser configured to control rotation of the intake camshaft by controlling an intake cam phase angle;
an exhaust valve configured to expel exhaust gases from the piston-cylinder assembly;
an exhaust camshaft configured to be rotated to control the exhaust valve;
an exhaust cam phaser configured to control rotation of the exhaust camshaft by controlling an exhaust cam phase angle;
a turbocharger having a turbine configured to be powered by the exhaust gases, the turbocharger being configured to deliver compressed air to the throttle valve;
a wastegate configured to allow at least a portion of the exhaust gases to bypass the turbine of the turbocharger through a selectively variable wastegate opening area;
an exhaust gas recirculation (EGR) valve configured to selectively recirculate a portion of the exhaust gases to the intake manifold through a selectively variable EGR valve opening area; and
a control system comprising:
a command generator module configured to generate a plurality of sets of possible command values for a plurality of controlled variables, the plurality of controlled variables being selected from the following: the wastegate opening area, the throttle opening area, the EGR valve opening area, the intake cam phase angle, and the exhaust cam phase angle;
a constraints consolidation module configured to:
generate a set of initial constraints for the plurality of controlled variables, the set of initial constraints including upper and lower limits for each controlled variable and upper and lower rate-of-change limits for each controlled variable; and
generate a set of consolidated constraint limits for the plurality of controlled variables, each consolidated constraint limit of the set of consolidated constraint limits being determined by consolidating one of the upper and lower limits with one of the upper and lower rate-of-change limits;
a cost module configured to determine a cost for each set of possible command values of the plurality of sets of possible command values; and
a selection module configured to select the set of possible command values of the plurality of sets of possible command values that has a lowest cost and falls within the set of consolidated constraint limits to define a set of selected command values, the set of selected command values including a selected command value for each controlled variable.

16. The propulsion system of claim 15, the set of consolidated constraint limits including an upper consolidated constraint limit for each controlled variable and a lower consolidated constraint limit for each controlled variable, the constraints consolidation module being configured to:
determine an upper rate-limit-based constraint for each controlled variable by:
multiplying the upper rate-of-change limit for a respective controlled variable by a time step duration to determine an upper rate limit product for the respective controlled variable; and
adding the upper rate limit product for the respective controlled variable to the selected command value for an immediate past time step of the respective controlled variable;
determine a lower rate-limit-based constraint for each controlled variable by:
multiplying the lower rate-of-change limit for a respective controlled variable by the time step duration to determine a lower rate limit product for the respective controlled variable; and
subtracting the lower rate limit product for the respective controlled variable from the selected command value for the immediate past time step of the respective controlled variable;
determine each upper consolidated constraint limit by selecting the lesser of the upper limit for the respective controlled variable and the upper rate-limit-based constraint for the respective controlled variable; and
determine each lower consolidated constraint limit by selecting the greater of the lower limit for the respective controlled variable and the lower rate-limit-based constraint for the respective controlled variable.

17. The propulsion system of claim 16, wherein each set of possible command values includes a possible commanded wastegate opening area, a possible commanded throttle opening area, a possible commanded EGR valve opening area, a possible commanded intake cam phase angle, and a possible commanded exhaust cam phase angle, and the selected set of possible command values includes a selected commanded wastegate opening area, a selected commanded throttle opening area, a selected commanded EGR valve opening area, a selected commanded intake cam phase angle, and a selected commanded exhaust cam phase angle, the propulsion system further comprising:
a boost actuator module configured to adjust the wastegate opening area based on the selected commanded wastegate opening area;

a throttle actuator module configured to adjust the throttle opening area based on the selected commanded throttle opening area;

an EGR actuator module configured to adjust the EGR valve opening area based on the selected commanded EGR valve opening area; and a phase actuation module configured to adjust the intake cam phase angle based on the selected commanded intake cam phase angle, the phase actuation module being further configured to adjust the exhaust cam phase angle based on the selected commanded exhaust cam phase angle.

18. The propulsion system of claim 17, further comprising:

a reference generator configured to determining a plurality of requested values, including a requested wastegate opening area, a requested throttle opening area, a requested EGR valve opening area, a requested intake cam phase angle, and a requested exhaust cam phase angle; and a prediction module configured to determine a plurality of predicted values, the cost module being configured to determine the cost for each set of possible command values of the plurality of sets of possible command values based on the plurality of requested values, the plurality of predicted values, and a plurality of weighting factors.

19. The propulsion system of claim 18, wherein the plurality of predicted values includes a predicted engine output torque, a predicted APC, a predicted amount of external dilution, a predicted amount of internal dilution, a predicted crankshaft angle, and a predicted combustion quality value.

20. The propulsion system of claim 19, the predicted combustion quality value being a predicted coefficient of variation, wherein the cost module is configured to determine the cost for each set of possible command values of the plurality of sets of possible command values with the following cost equation:

$$\text{Cost} = \sum (y(i|k) - y_{ref})^T Q_Y (y(i|k) - y_{ref}) +$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_p \\ APC\_p \\ Dil\_ext\_p \\ Dil\_res\_p \\ CA\_p \\ COV\_p \end{bmatrix}$$

$$y_{ref} = \begin{bmatrix} Te\_r \\ APC\_r \\ Dil\_ext\_r \\ Dil\_res\_r \\ CA\_r \\ COV\_r \end{bmatrix}$$

$$u = \begin{bmatrix} WGO\_c \\ EGRO\_c \\ TO\_c \\ ICPA\_c \\ ECPA\_c \end{bmatrix}$$

$$u_{ref} = \begin{bmatrix} WGO\_r \\ EGRO\_r \\ TO\_r \\ ICPA\_r \\ ECPA\_r \end{bmatrix}$$

where

Te_p=the predicted engine output torque;

APC_p=the predicted APC;

Dil_ext_p=the predicted amount of external dilution;

Dil_res_p=the predicted amount of internal dilution;

CA_p=the predicted crankshaft angle, with respect to a predetermined CA50 value;

COV_p=the predicted coefficient of variation;

Te_r=a requested engine output torque;

APC_r=a requested APC;

Dil_ext_r=a requested amount of external dilution;

Dil_res_r=a requested amount of internal dilution;

CA_r=a requested crankshaft angle, with respect to the predetermined CA50 value;

COV_r=a requested coefficient of variation;

WGO_c=the possible commanded wastegate opening area;

EGRO_c=the possible commanded EGR valve opening area;

TO_c=the possible commanded throttle opening area;

ICPA_c=the possible commanded intake cam phase angle;

ECPA_c=the possible commanded exhaust cam phase angle;

WGO_r=the requested wastegate opening area;

EGRO_r=the requested EGR valve opening area;

TO_r=the requested throttle opening area;

ICPA_r=the requested intake cam phase angle;

ECPA_r=the requested exhaust cam phase angle;

$Q_y$=a predetermined weighting value for each y value;

$Q_u$=a predetermined weighting value for each u value;

$Q_{\Delta u}$=a predetermined weighting value for a rate of change of each u value;

i=an index value;

k=a prediction step; and

T=a transposed vector.

* * * * *